(12) United States Patent
Martel

(10) Patent No.: US 9,544,565 B1
(45) Date of Patent: Jan. 10, 2017

(54) PROCESS AND METHOD FOR THREE DIMENSIONAL DATA ACQUISITION

(71) Applicant: Thomas Martel, Manlius, NY (US)

(72) Inventor: Thomas Martel, Manlius, NY (US)

(73) Assignee: Vy Corporation, Wayne, PA (US)

( * ) Notice: Subject to any disclaimer, the term of this patent is extended or adjusted under 35 U.S.C. 154(b) by 214 days.

(21) Appl. No.: 14/269,391

(22) Filed: May 5, 2014

Related U.S. Application Data

(60) Provisional application No. 61/819,071, filed on May 3, 2013.

(51) Int. Cl.
*H04N 13/00* (2006.01)

(52) U.S. Cl.
CPC ................ *H04N 13/0007* (2013.01)

(58) Field of Classification Search
CPC .... H04N 13/0007; G06K 9/468; G06T 7/0075
See application file for complete search history.

(56) References Cited

U.S. PATENT DOCUMENTS 5,988,862 A * 11/1999 Kacyra ............... G01B 11/002
382/195

* cited by examiner

*Primary Examiner* — Siamak Harandi
(74) *Attorney, Agent, or Firm* — Arlene P. Neal; Neal Blibo, LLC

(57) ABSTRACT

Data for making calculations from a three dimensional observation is derived from a recording device. The data is combined with information developed by a three dimensional remote sensing platform to create measurement points in space for an object. Descriptive information from at least one object model is used to direct at least one of a resolution resource, results gained from group measurements and an object-deployed resolution asset. Order is thereafter found in two dimensional to three dimensional observations in a subject area.

18 Claims, 3 Drawing Sheets

US 9,544,565 B1

PROCESS AND METHOD FOR THREE DIMENSIONAL DATA ACQUISITION

CROSS-REFERENCE TO RELATED APPLICATIONS

The present application is related to claims benefit under 35 U.S.C. §119(e) from U.S. Provisional Patent Application Ser. No. 61/819,071, the entire contents of which is incorporated herein by reference.

BACKGROUND OF THE INVENTION

Images may be obtained from a camera, the Internet or another source and stored as electronic data. In order for a user to identify shapes as they appear in still or moving images, the pixels associated with the electronically acquired data must be analyzed and the shapes identified. Constituent elements of an image, such as pixels, or groups of pixels, may be organized into meaningful groups. These elements are typically identified by known analytical processes. In particular, these elements may be organized and grouped to identify curved regions and boundaries. U.S. Pat. No. 7,734,112, which is incorporated by reference herein, describes this type of organization.

U.S. patent application Ser. No. 13/550,829, which is incorporated by reference herein, describes embodiments where images may be analyzed in different levels according to a "ladder of abstraction". The primary level in the ladder involves analysis of pixels from an image. The next levels in the ladder involve analysis of grenze sets, curve primitives and/or region (area) primitives. Next in the ladder is a mezzanine level, a level between analysis of generic curve primitives (for example, cubic splines, curves), region primitives (for example, 3-dimensional surfaces, convex or concave surfaces), and the analysis of frank object models. A frank object model is a model of an object having utility value to human beings. Examples of frank object models in an image could include, but are not limited to, a face, the human form, cars, vehicles, aircraft, weapons, railroads, buildings, transportation infrastructure, natural artifacts (for example, plants, animals, fruit), cell, nuclei, organelles, and other living tissues.

At the mezzanine level, shapes are sought without regard to an object identity as it relates to human utility, and without regard to the pixel arrangement of the focal plane array. Shape classes at the mezzanine level may include, for example, ellipses, circles, straight lines, arcs (pieces of ellipses) and angle primitives. Shape characteristics, concave-side and convex-side color and shading characteristics, and possibly statistics (characteristic of texture) are used to guide a process of association. In the process of association, Bézier curves may be connected. Bézier curves are cubic splines that are connected into larger splines and that "continue" around whole compact objects without regard to pixel geometry.

In addition to Bézier curves, other geometric objects may also be derived from conventional pixel-based images, for example, by converting pixels into mathematical functions in order to obtain very accurate information about starting points, ending points, endpoint angles, and/or perpendicular directionality in two dimensions; by combining this very accurate spatial metadata with the information developed by currently-available 3-D remote sensing platforms in order to create very accurate measurements in space at a higher level of resolution than the current state of the art permits.

Accordingly, there is a need for a process and method for three dimensional data acquisition.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
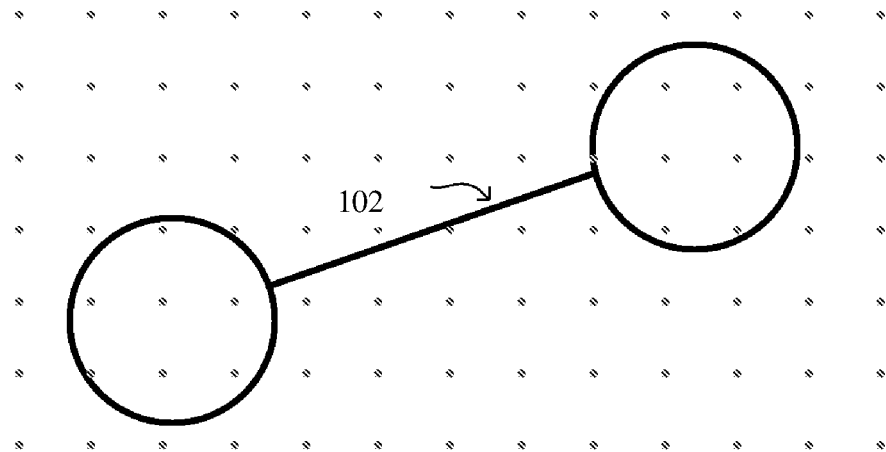
FIG. 1 is a block diagram of a ring-and-line figure that represents an arbitrary object that would be present in a typical field of view in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments may be directed to deriving data, from a recording device, for making calculations from a three dimensional observation; combining the data with information developed by a three dimensional remote sensing platform to create measurement points in space for an object; using descriptive information from at least one object model to direct at least one of a resolution resource, results gained from group measurements and an object-deployed resolution asset; and finding order in two dimensional to three dimensional observations in a subject area.

Embodiments may be directed to a method for extending the ability to find order in two dimensions to three-dimensional observations. Data for making calculations from three-dimensional observations can be derived from a recording device, including but not limited to, cameras, laser interferometry, laser Time of Flight (TOF) calculations, radar, and/or sonar. Pixels in an image captured by the recording device may be converted into mathematical functions in order to obtain accurate information about, for example, starting points, ending points, endpoint angles and/or perpendicular directionality in two dimensions. The obtained information may be combined with information developed by currently-available 3-D remote sensing platforms to create accurate measurements in space at a higher level of resolution than the current state of the art permits.

Embodiments may extend the ability to find order in three-dimensional subject areas, such as, flexible manufacturing (including, for example, welding on a curve, adhesives application, adhesive curing (UV light), finishing (including, for example, grinding, polishing, and painting) and dispensing of liquids). Some embodiments may also extend the ability to find order in three-dimensional subject areas, such as, robotic applications involving motion through a three dimensional space, pipeline inspection and aerial analysis as it relates to infrastructure. Embodiments may also extend the ability to find order in extended depth of field microscopy (EDOF). A non-limiting example of EDOF may include creating a three-dimensional representation of a tissue sample that may include, for example, individual cells, cell nuclei, cell clusters, or areas of interest within individual cells, cell nuclei, or groups of cells.

Some embodiments may also extend the ability to find order in, for example, security applications using a binocular camera. For example, embodiments may extend the ability to find order in a three-point camera, such as a binocular low resolution or monocular high resolution camera. Some embodiments may also extend the ability to find order in, for example, robotic applications involving motion through a three-dimensional space including, for example, object avoidance, road following, stairs and inclines, and identifying smoke/dust clouds and airborne obstructions. Some embodiments may also extend the ability to find cells clustered together in three dimensions.

Some embodiments may also extend the ability to find order in, for example, pipeline inspection including, for example, interior (pigs), such as crack detection, weld flaws, material build-up, corrosion detection, manufacturing flaws, x-ray detector, and guide ultrasound sensor in physical contact with surface of pipe, or exterior unmanned vehicles (for example, unmanned aerial vehicle, unmanned ground vehicle or unmanned underwater vehicle), such as autonomous pipeline following, security patrol (including, for example, moving-camera motion detection, object left behind, tag and track people, vehicles, and weapons), leak detection (including, for example, spills, jets, vapor clouds, and fire), ground-penetrating radar which may have the same resolution issues as seen with LIDAR, and sonar such as underwater pipelines and other structures.

Some embodiments may also extend the ability to find order in, for example, aerial analysis as it relates to infrastructure including, for example, building heights, bridges (including, for example, cable sag, and bridges with the same or similar security issues as pipelines as noted above), radio towers, dams and earthworks, electrical utility towers (pylons), power lines, railroads, road and pathways (including, for example, interstate highways and right of way observations).

Consider, for example, that LIDAR is used as a recording device. Embodiments may direct the deployment of resolution resources to appropriate regions of a field of view (FOV) with direction. The criteria by which this "direction" is to be accomplished may be taken from edges and other features recognized by an algorithm used for finding order, as disclosed, for example, in U.S. patent application Ser. No. 13/550,829, which is incorporated by reference herein. The adjustment/modulation of gain, pulse width modulation, frequency content, and other relevant operating parameters of a LIDAR unit may be based on, for example, the edge shape, image content, and order in a scene. The use of an "order-directed resolution" to leverage resolution assets may be implemented in such a way as to achieve a higher "effective resolution" or "effective sample rate" than could be otherwise achieved. This is also referred to herein as "flexible resolution asset deployment" or "directed resolution asset deployment".

FIG. 1 is a diagram of a ring-and-line figure that represents an arbitrary object that would be present in a typical field of view in accordance with some embodiments. The regularly-spaced dots represent the locations of measurement points in space, wherein the measurement points are located without regard for the position or morphology of arbitrary object 102 and current LIDAR has no way to detect or discover the morphology of objects in the FOV.

Figure 2:
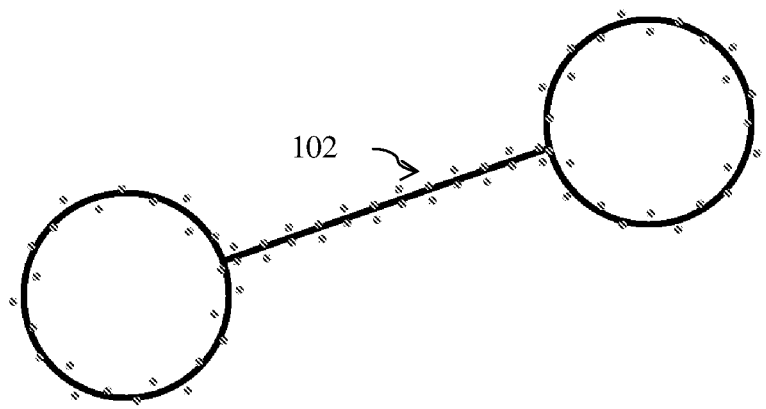
FIG. 2 is a further block diagram of the arbitrary object in accordance with some embodiment.

FIG. 2 is a further diagram of the arbitrary object in accordance with some embodiment. In FIG. 2, the locations of several of the measurement points have been modified so as to deploy the measurement points in a manner that coincides with the edges of arbitrary object 102. The discovery of these edges may be accomplished by means of a conventional optical camera operating in conjunction with, for example, an edge-detection Bézier curve fitting means. Embodiments make it possible to more efficiently allocate the measurement bandwidth of range finding means such as LIDAR or laser interferometry.

Object models may be used as a means for directing resolution assets and the synergistic interplay between the descriptions of object models. The descriptive information may be used to direct resolution assets, co-equal results gained from group measurements, and "object-deployed resolution assets". The "object-deployed resolution assets" may be used to further delineate characteristics of an object model in a recursive or regenerative architecture. The direction of a laser beam raster may be throughout a FOV along vector contours (i.e., contours that are described by vectors and curves wherein those curves may be discovered by an algorithm such as disclosed in U.S. patent application Ser. No. 13/550,829). Curves as discussed herein may be, for example, Bézier curves, but in a more general sense the curve description could be of any of the numerous mathematical descriptions of curves. Examples would include conic sections, spline-fit functions, members of a wavelet transform basis vector set, and curves defined by projections of three-dimensional forms and objects.

Depth information (for example, z-axis information) may be used as a pruning means for limiting the proliferation of nodes within decision trees under the algorithm for finding order or under other search algorithms. Such depth information to be obtained by, for example, LIDAR, laser interferometry, radar time-of-flight data, sonic or sonar time-of-flight means, or by other technical means. It is to be understood that the "depth information" may be, for example, information that can be obtained either by TOF measurements made on energy pulses (generated by a laser in the instance of LIDAR, or by directional radio pulses in the context of radar). This z-axis information can be obtained from either measurements of TOF, or from phase shift information that arises from the use of coherent radiation particularly that derived from laser interferometry of the type used in laser theodolites.

In addition, analog circuitry may be used to direct the steering means for a laser beam (or other directed energy source) along edges or vectors defined by means described above. For example, analog circuitry may be used to direct a mirror or other beam steering means along an x- and y-velocity profile. This would create vector pathways in space along which the beam could be directed. In such a case, digital information would be used to specify the endpoints of the linear pathway, but the multiplicity of intervening points that would form a line segment connecting those endpoints would be generated by the analog velocity profile of the x- and y-movements of the mirror or beam steering means.

Figure 3:
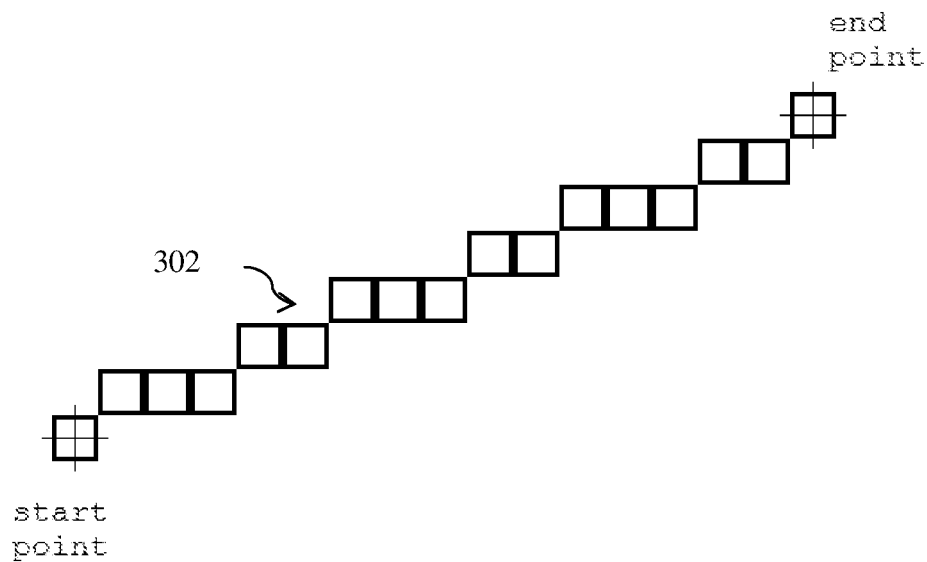
FIG. 3 illustrates a vector generated using pixels according to some embodiments.

FIG. 3 illustrates a vector generated using pixels according to some embodiments. Each pixel 302 is of finite size, and regions in between pixels 302 are not defined. FIG. 3 illustrates the placement of measurement points by digital control means, in which the position of each of the points is individually determined by numerical x- and y-coordinates.

Figure 4:
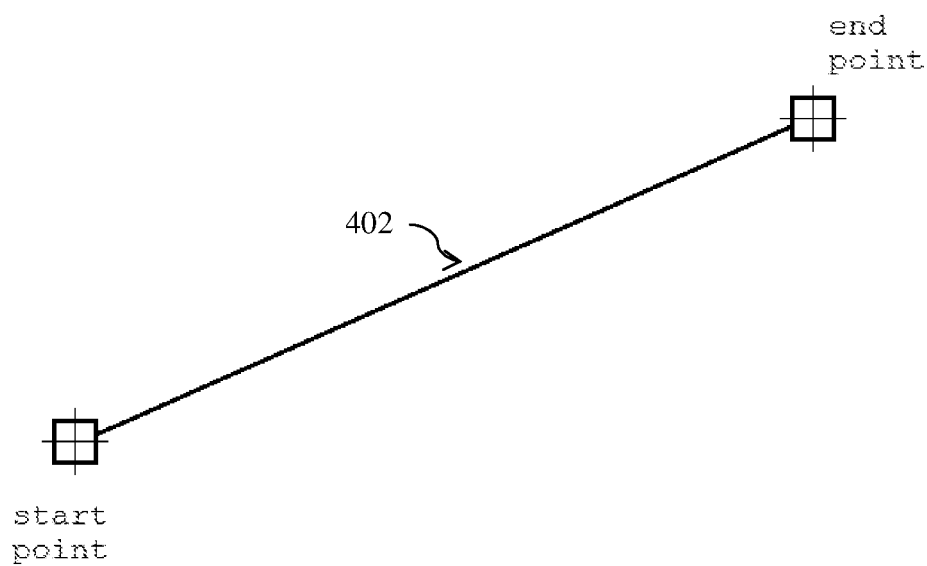
FIG. 4 illustrates analog vector generation with placement of measurement points in accordance with some embodiments.

FIG. 4 illustrates analog vector generation with placement of measurement points in accordance with some embodiments. Measurement points may be placed along line segment 402 or a curved path (not shown) where that curve is defined by one or more polynomials. Measurement points may be placed by sweeping a laser beam using analog velocity control of x- and y-position by analog control of beam steering means. This is a technique well known, for example, to those familiar with the art of creating vectorized laser graphic display. Embodiments further advance the known laser range finding by applying it to the formation of LIDAR data sets, as well as to the art of laser interferometry.

Birefringent crystals, optical fan-out gratings, cylindrical lenses or other spatial modulation techniques may be used to create "patterned illumination." This patterned lighting may be used to create split radiation patterns wherein pairs of beams may be directed in such a way as to straddle an edge otherwise detected by algorithm means. One possible use of the information arising from these split-beam cases would be to achieve very high contrast ratios between a foreground object (found on one side of a curve or vector edge) and a background, which may contain objects or may consist of empty space of great or infinite depth.

Polarized light (light modulated or encoded by any of the various means) may be used to distinguish or encode radiation along different closely aligned angular directions. These light modulation or encoding means could be used to "straddle" an edge detected by algorithm means. Modulation and encoding techniques may include (in addition to polarization) the use of pseudorandom binary strings, numerical sequences arising from other mathematical means such as those used in the field of cryptography and steganography, and other mathematical or symbolic methods, to impose phase, frequency, or pulse length modulation on the directed energy beam.

Holographic gratings may be used to impose structure on an otherwise near-Gaussian laser spot irradiance distribution pattern. Electro-optic means may also be used to orient and direct such structure in a manner similar to (or complementary to) the structural features of the observed structure or form. For example, a holographic grating may be used to create a "linear spot". This linear spot could be rotated in space by mechanically rotating the grating (or by other optical or electro-optical means) in such a way as to align the long axis of the linear laser spot with the direction of a one or more features of a linear structure of interest, such as a wire, a cable, a pipeline, a load-bearing beam or member, or nuclear membranes, cells, or other living tissue.

Figure 5:
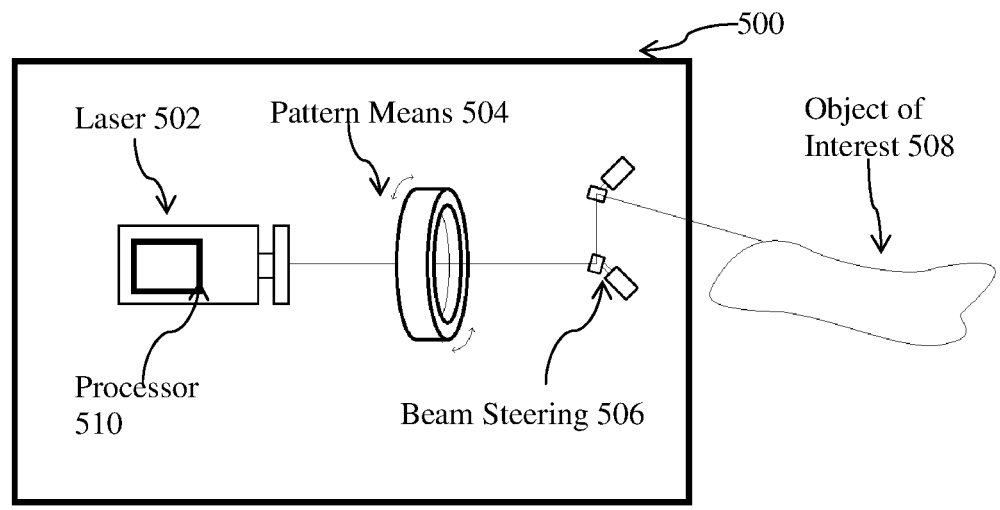
FIG. 5 illustrates pattern generation and alignment device used in accordance with some embodiments.

FIG. 5 illustrates a pattern generation and alignment device used in accordance with some embodiments. Device 500 includes a laser 502 or another directed energy source, a pattern means 504, a beam steering means 506 and a processor 510. Processor 510 may direct the operations of one or more of laser 502, pattern means 504, and beam steering means 506. Beam steering means is directed toward an object of interest 508. Object of interest 508 may be, for example, a man-made or naturally occurring target subject. The target subject has a property for enabling it to reflect, scatter, fluoresce, phosphoresce, and/or otherwise interact with a beam irradiance profile issuing from laser 502 or other directed energy source so as to return a signal.

Laser 504 is capable of projecting a very narrow beam of photons or other probing means out into space. Information about the distance between laser 504 and object of interest 508 may be generated by measuring the elapsed time from the instant a probing pulse leaves a generator and the instant a return signal is received. Beam steering means 506 may include optical, electrooptical, electromechanical, or purely mechanical means for directing an irradiance pattern in space. Such means may typically include an arrangement of motor-driven reflective mirrors. Electric motors may be used to vary the position of these mirrors in accord with instructions issued by processor 510. Beam steering means 506 may thus be used to generate directional information and these elements work in concert to generate a multiplicity of distance and direction measurements that detect and characterize surfaces in a three-dimensional region.

Pattern means 504 may be an optical or electrooptical device designed to impose a specific desired irradiance or phase pattern on a laser beam or other directed energy source. In the context of photon beams such as those generated by lasers, beam shaping can be accomplished by means of cylindrical lenses, although other means may exist. Some embodiments use mechanical, electromechanical, acoustic, or other means to rotate the long axis of this linear irradiance profile in real time, in response to shape information gathered by an order-finding algorithm. The goal of this rotational beam shaping element is to adaptively align the long axis of the linear irradiance profile in a direction parallel to various edges of interest in the three-dimensional field of interest. By so doing, information from a multiplicity of points along the edge and also to either side of the edge is collected from the return signal. The use of data arising from said multiplicity of points is advantageous from the standpoint of improved signal-to-noise ratio and improved tolerance of the spurious effects of small surface defects, texture effects, dust, and other appearance variables that arise in the context of practical applications.

Figure 6:
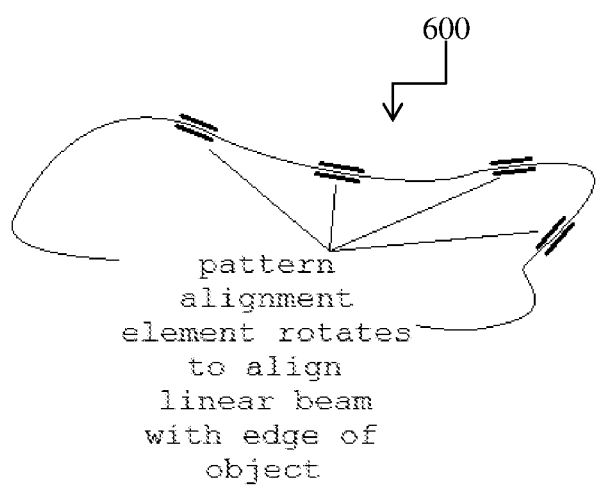
FIG. 6 also illustrates patterned illumination beam profile in accordance with some embodiments.

FIG. 6 also illustrates patterned illumination beam profile in accordance with some embodiments. FIG. 6 illustrates an example of a beam shaped in such a manner as to impose a linear irradiance profile on the projected beam; such a profile would appear to an observer as a narrow line if projected on a screen or other flat surface. The patterned illumination beam profile 600 is actively aligned with the edge of object of interest 508, as shown in FIG. 5. In some embodiments, in order to position all the points of a Bezier curve along the underlying object of interest 508, it may be necessary to have a model that covers a larger scale of object of interest 508 than just the little part that is under the Bezier curve. Although there may be more than one reason for this, one reason is that it is impossible for a Bezier-fit algorithm to estimate the slope at the endpoints (first and maybe even second derivative) in the absence of information about "where the curve goes" outside the region of fit. Without that knowledge, the behavior of the Bezier curve at the endpoints is usually a poor approximation of reality.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method, comprising
deriving data, from a recording device, for making calculations from a three dimensional observation;
combining, by the recording device, the calculations with information developed by a three dimensional remote sensing platform to create measurement points in space for an object;
using, by the recording device, descriptive information from at least one object model to estimate locations of the measurement points and direct at least one of a resolution resource, results gained from group measurements and an object-deployed resolution asset; and
finding order, by the recording device, in two dimensional to three dimensional observations in a subject area.

2. The method of claim 1, further comprising obtaining depth information from one of measurements of time of flight on energy pluses and phase shift information that arises from the use of coherent radiation; and
using the depth information to limit a proliferation of nodes within a decision tree used for finding order.

3. The method of claim 1, wherein the using descriptive information comprises directing a directed energy source of the recording device through a field of view along vector contours.

4. The method of claim 1, wherein the using descriptive information comprises directing, with an analog circuit, a steering means of a directed energy source of the recording device along at least one of edges or vectors of the object.

5. The method of claim 4, wherein the directing comprises creating vector pathways in space for directing the directed energy source, wherein a multiplicity of intervening points are configured to form a line segment connecting endpoints of a linear pathway, wherein the intervening points are generated by an analog velocity profile of movements of the steering means.

6. The method of claim 5, further comprising placing the measurement points along one of the line segment and a curved path where that curve is defined by one or more polynomials.

7. The method of claim 1, further comprising creating a patterned illumination with one of birefringent crystals, optical fan-out gratings, and a spatial modulation technique, wherein the patterned illumination creates split radiation patterns wherein pairs of beams are directed to straddle an edge of the object.

8. The method of claim 1, further comprising using polarized light to encode radiation along different closely aligned angular directions, wherein one of light modulation and encoding means is used to straddle an edge of the object.

9. The method of claim 1, wherein the combining comprises modifying locations of several of the measurement points according to edges of the object.

10. The method of claim 1, wherein the object-deployed resolution asset is used to delineate characteristics of the object model in one of a recursive architecture and a regenerative architecture.

11. The method of claim 1, wherein the deriving comprises converting pixels in an image captured by the recording device into a mathematical function to obtain information about at least one of points, angles and directionality in two dimensions.

12. The method of claim 1, further comprising adjusting operating parameters of the recording device according to at least one of an edge, shape, image content and order in a scene.

13. The method of claim 1, further comprising using one of holographic gratings an electro-optic means to impose a structure on a laser spot brightness distribution pattern and to direct the structure based on structural features of one of an observed structure and form.

14. A pattern generation and alignment device, comprising:
 a processor configured to direct operations at least one of a laser, a pattern means, and a beam steering means to:
  derive data for making calculations from a three dimensional observation;
  combine the calculations with information developed by a three dimensional remote sensing platform to create measurement points in space for an object;
  use descriptive information from at least one object model to estimate locations of the measurement points and direct at least one of a resolution resource, results gained from group measurements and an object-deployed resolution asset; and
  find order in two dimensional to three dimensional observations in a subject area.

15. The device of claim 14, wherein the recording device is a directed energy source capable of projecting probing means out into space and deriving data for making calculations from a three dimensional observation.

16. The device of claim 14, further comprising a beam steering means configured to operate with a directed energy source to generate a multiplicity of distance and direction measurements that detect and characterize surfaces in a three-dimensional region.

17. The device of claim 14, further comprising a pattern means configured to impose a specific irradiance on a directed energy source.

18. The device of claim 17, further configured to rotate a long axis of an irradiance profile in real time, responsive to shape information gathered by an order-finding algorithm.

* * * * *